(12) United States Patent
Fornage (10) Patent No.: US 8,717,780 B2
(45) Date of Patent: *May 6, 2014

(54) METHOD AND APPARATUS FOR CONVERTING DIRECT CURRENT TO ALTERNATING CURRENT

(75) Inventor: Martin Fornage, Petaluma, CA (US)

(73) Assignee: Enphase Energy, Inc., Petaluma, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/807,715

(22) Filed: Sep. 13, 2010

(65) Prior Publication Data

US 2011/0012429 A1 Jan. 20, 2011

Related U.S. Application Data

(63) Continuation of application No. 11/725,763, filed on Mar. 20, 2007, now Pat. No. 7,796,412.

(60) Provisional application No. 60/743,713, filed on Mar. 23, 2006.

(51) Int. Cl.
*H02M 3/335* (2006.01)

(52) U.S. Cl.
USPC ............................ 363/16; 363/97; 363/21.14

(58) Field of Classification Search
CPC .......... H02J 3/382; H02M 3/285; H02M 3/48
USPC ......... 363/16, 20, 21.01, 21.12, 21.15, 21.17, 363/21.28, 95, 97, 131
See application file for complete search history.

(56) References Cited

U.S. PATENT DOCUMENTS

| | | | |
|---|---|---|---|
| 4,404,472 A | 9/1983 | Steigerwald | |
| 4,626,983 A | 12/1986 | Harada et al. | |
| 4,870,553 A | 9/1989 | Brown | |
| 5,268,832 A | 12/1993 | Kandatsu | |
| 5,430,635 A | 7/1995 | Liu | |
| 5,508,903 A | 4/1996 | Alexndrov | |
| 5,594,635 A | 1/1997 | Gegner | |
| 5,768,118 A * | 6/1998 | Faulk et al. | 363/72 |
| 5,796,595 A | 8/1998 | Cross | |

(Continued)

FOREIGN PATENT DOCUMENTS

| | | |
|---|---|---|
| JP | 59070147 A | 4/1984 |
| JP | 09047021 A2 | 2/1997 |
| JP | 09131067 A2 | 5/1997 |
| JP | 2003235252 A2 | 8/2003 |

OTHER PUBLICATIONS

Burra, R., et al., "A Low-Cost Fuel-Cell (FC) Power Electronic System (PES) for Residential Loads," 0-7803-8458-X/04, © 2004, *IEEE*, pp. 468-473.

(Continued)

*Primary Examiner* — Matthew Nguyen
(74) *Attorney, Agent, or Firm* — Moser Taboada (57) ABSTRACT

A method and apparatus for power conversion. In one embodiment, the apparatus comprises at least two power stages, each power stage of the at least two power stages capable of converting DC input power to DC output power; and a controller for dynamically selecting, based on a first DC power, one or more power stages of the at least two power stages for converting the first DC power to a second DC power.

20 Claims, 7 Drawing Sheets

(56) References Cited

U.S. PATENT DOCUMENTS

| | | | | |
|---|---|---|---|---|
| 5,818,703 | A | * | 10/1998 | Jacobson .................. 363/21.13 |
| 5,886,890 | A | | 3/1999 | Ishida et al. |
| 5,898,585 | A | | 4/1999 | Sirichote et al. |
| 6,031,736 | A | | 2/2000 | Takehara et al. |
| 6,046,919 | A | | 4/2000 | Madenokouji et al. |
| 6,201,180 | B1 | | 3/2001 | Meyer et al. |
| 6,255,804 | B1 | | 7/2001 | Herniter et al. |
| 6,301,129 | B1 | | 10/2001 | Yasumura |
| 6,594,161 | B2 | * | 7/2003 | Jansen et al. ............... 363/21.14 |
| 6,678,176 | B2 | | 1/2004 | Lumsden |
| 6,703,796 | B2 | * | 3/2004 | Che-Chen et al. ............ 315/291 |
| 6,809,942 | B2 | | 10/2004 | Madenokouji et al. |
| 7,515,442 | B2 | * | 4/2009 | Mikulenka et al. ........ 363/21.12 |
| 7,675,759 | B2 | | 3/2010 | Artusi et al. |
| 8,351,230 | B2 | * | 1/2013 | Nishihara et al. ............... 363/97 |
| 2005/0036345 | A1 | | 2/2005 | Lin et al. |
| 2005/0270000 | A1 | | 12/2005 | Chang et al. |
| 2006/0062034 | A1 | | 3/2006 | Mazumder et al. |

OTHER PUBLICATIONS

Basso, Christophe, "A 30 W Power Supply Operating in Quasi-Square Wave Resonant Mode", *ON Semiconductor*, Publication Order No. AND8129/D, Oct. 2003—Rev. 0.

"*PID Controller*," downloaded from eCircuit Center web site, http://www.ecircuitcenter.com/Circuits/pid1/pid1.htm, on Mar. 6, 2007, pp. 1-6.

Kern, G., "SunSine™300: Manufacture of an AC Photovoltaic Module," Final Report, Phases I & II, Jul. 25, 1995-Jun. 30, 1998, National Renewable Energy Laboratory (NREL), NREL/SR-520-26085, Mar. 1999.

Saha, S., et al., "Novel grid-connected photovoltaic inverter," *IEE Proc.-Gener. Transm. Distrib.*, vol. 143, No. 2, Mar. 1996, pages 219-224.

UL-1741 ed. 1, "Standard for Inverters, Converters, Controllers and Interconnection System Equipment for Use with Distributed Energy Resources," May 1999, downloaded from http://ulstandardsinfonet.ul.com/scopes/1741.html on Jun. 6, 2007.

International Search Report and Written Opinion mailed Sep. 4, 2007 for PCT Application No. PCT/US2007/006841.

International Preliminary Report on Patentability and Written Opinion mailed Oct. 2, 2008 for PCT Application No. PCT/US2007/006841.

Non-Final Office Action dated Feb. 26, 2009 for U.S. Appl. No. 11/725,763 entitled "Method and Apparatus for Converting Direct Current to Alternating Current", 14 pages.

Final Office Action dated Aug. 26, 2009 for U.S. Appl. No. 11/725,763 entitled "Method and Apparatus for Converting Direct Current to Alternating Current", 11 pages.

Advisory Action dated Nov. 10, 2009 for U.S. Appl. No. 11/725,763 entitled "Method and Apparatus for Converting Direct Current to Alternating Current", 2 pages.

Notice of Panel Decision from Pre-Appeal Brief Review dated Feb. 3, 2010 for U.S. Appl. No. 11/725,763 entitled "Method and Apparatus for Converting Direct Current to Alternating Current", 2 pages.

Examiner's Answer dated Apr. 21, 2010 for U.S. Appl. No. 11/725,763 entitled "Method and Apparatus for Converting Direct Current to Alternating Current", 14 pages.

PTO Notice regarding Examiner's Answer dated May 11, 2010 for U.S. Appl. No. 11/725,763 entitled "Method and Apparatus for Converting Direct Current to Alternating Current", 2 pages.

European Search Report dated Apr. 4, 2012 for European Patent Application No. 07251246.0-1242.

Notice of Reasons for Rejection—Examiner's Report for Japanese Patent Application No. P2007-077602 dated Mar. 1, 2012, 6 pages total (3-page report in Japanese and 3-page report translated).

Korean Office Action dated Jun. 12, 2012 for Korean Patent Application No. 10-2008-7025255, 4 pages.

"A Parallel-Connected Single Phase Power Factor Correction Approach with Improved Efficiency", Sangsun Kim and Prasad N. Enjeti, Power Electronics and Power Quality Laboratory, Department of Electrical Engineering, Texas A&M University, IEEE, 2002, pp. 263-269.

Abstract attached to a Master's Degree Thesis of Chosun University entitled "A Study on the Maximum Power Point Tracking Control for Photovoltaic System", dated Feb. 25, 2001, 47 pages.

Abstract attached to a doctoral dissertation of Seoul National University entitled "Design and Analysis of Automotive High Intensity Discharge Lamp", dated Dec. 2000, 198 Pages.

Soeren Baekhoej Kjaer et al., "A Review of Single-Phase Grid-Connected Inverters for Photovoltaic Modules", IEEE, 2005, pp. 1-15.

Jin Sung Kim, "Improvement of the Response Characteristics of the Paralleled Converter Operating as the Redundancy Power Supply", Doctoral Dissertation, Department of Electrical Engineering, Graduate School, Chungnam National University, Feb. 2000, pp. 1-144 (English Abstract on pp. 119-121).

Notice of Allowance and Fee(s) Due dated Jul. 13, 2010 for U.S. Appl. No. 11/725,763, 8 pgs.

Kim Jeong-won, "Configuration and Control Method of Modular Converter Schemes for Distributed Power System", Doctoral Dissertation of Seoul National University, Dec. 2000, 213 pages. (English Abstract on pp. 194-195).

\* cited by examiner

METHOD AND APPARATUS FOR CONVERTING DIRECT CURRENT TO ALTERNATING CURRENT

CROSS-REFERENCE TO RELATED APPLICATIONS

The present invention is a continuation of U.S. patent application Ser. No. 11/725,763, filed Mar. 20, 2007 now U.S. Pat. No. 7,796,412, which claims benefit of U.S. provisional patent application Ser. No. 60/743,713, filed on Mar. 23, 2006. Each of the aforementioned patent applications is herein incorporated in its entirety by reference.

BACKGROUND OF THE INVENTION

1. Field of the Invention

The present invention relates generally to inverters that convert Direct Current (DC) to Alternating Current (AC). More particularly, the present invention relates to a micro-inverter that dynamically selects conversion parameters for converting DC to AC.

2. Description of the Related Art

Historically, solar panels have been used mostly in remote applications where commercial power was not available. This was due to the high cost of an installation making it an economical choice only when nothing else was available. However, it is now well established that the fossil energy reserves, which are currently used to generate electricity, are being rapidly depleted. The worldwide growth of power demand is leading to a durable increase in energy cost. Short of the development of a clean nuclear fusion process, there is no foreseeable end to such trend.

Photovoltaic generation systems require an inverter that converts Direct Current (DC) from solar cells to Alternating Current (AC) for use by household appliances, for example. It is important for any power generation system to produce and deliver electricity to electric appliances in the most efficient manner. A typical photovoltaic array comprises a plurality of sub-arrays, where each sub-array comprises coupled individual solar panels. A junction box combines the output of the various sub-arrays to form a DC signal that is supplied to an inverter. The inverter converts the DC to AC and supplies the AC to the power grid. The user uses power from the grid in a typical fashion; however, their cost of electricity from the grid is offset by the amount of electricity the photovoltaic generation system supplies to the grid.

In such a system, the amount of power that is efficiently coupled to the grid is important for the cost recovery of the system. As such, the inverter must be as efficient as possible.

To enhance the overall efficiency, present technology uses "micro-inverters", such that each solar panel is coupled to an individual inverter. The AC outputs of the micro-inverters are combined and coupled to the power grid. Although the use of micro-inverters is more efficient than a single inverter, the efficiency of each individual micro-inverter is typically 90% or less.

Therefore, there is a need for a method and apparatus for efficiently converting DC to AC.

SUMMARY OF THE INVENTION

In one embodiment, the present invention discloses a method and apparatus for power conversion. In one embodiment, the apparatus comprises at least two power stages, each power stage of the at least two power stages capable of converting DC input power to DC output power; and a controller for dynamically selecting, based on a first DC power, one or more power stages of the at least two power stages for converting the first DC power to a second DC power.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
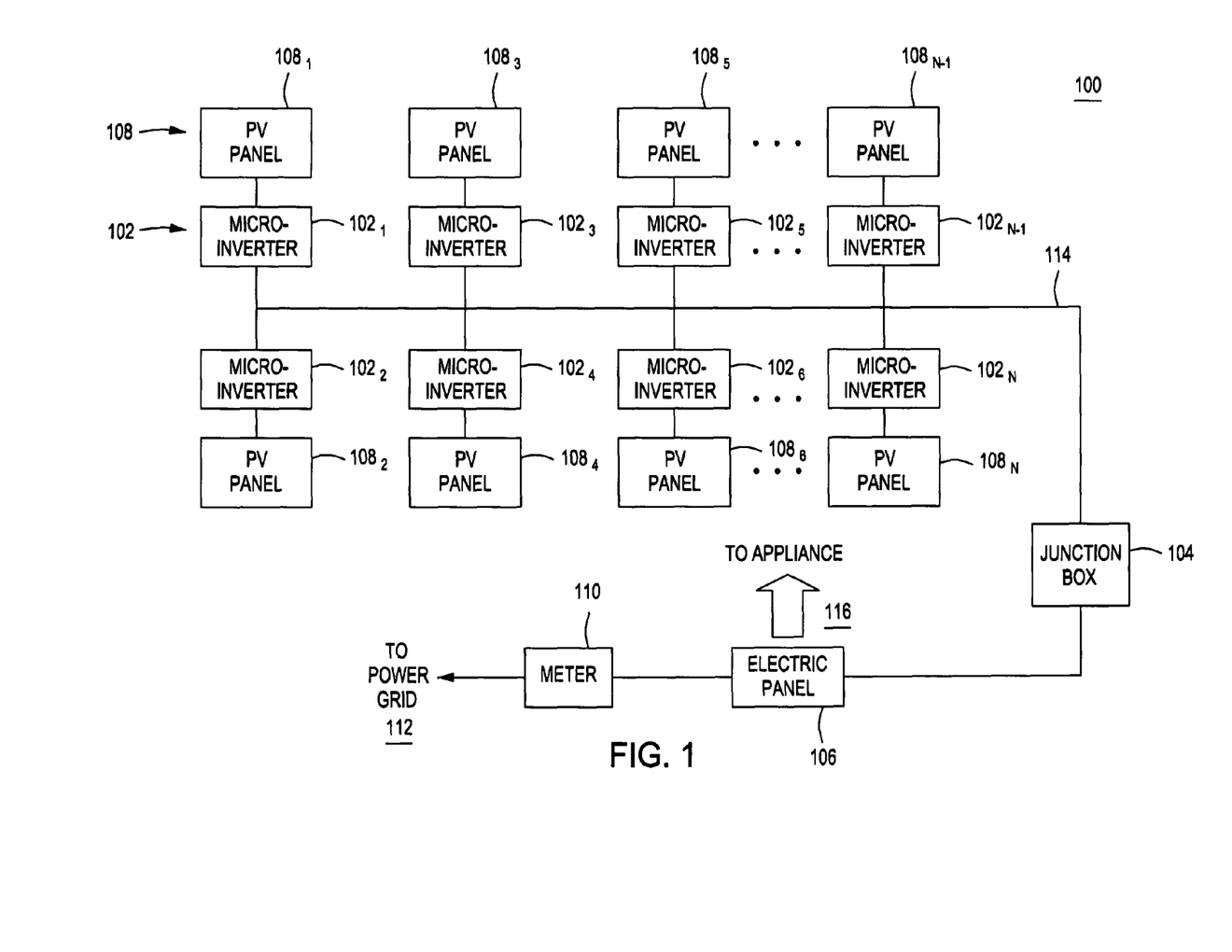
FIG. 1 is a block diagram of an exemplary power generation system that utilizes one embodiment of the present invention.

FIG. 1 is a block diagram of an exemplary power generation system 100 that utilizes one embodiment of the present invention. This diagram only portrays one variation of the myriad of possible system configurations. The present invention can function in a variety of environments and systems.

The power generation system 100 comprises a plurality of micro-inverters $102_1$, $102_2$ ... $102_n$, a junction box 104, an electric panel 106, a plurality of photovoltaic panels $108_1$, $108_2$ ... $108_n$, and an electric meter 110. The system 100 supplies power to a power grid 112, appliances 116, or both. The plurality of photovoltaic panels $108_1$, $108_2$ ... $108_n$ are well known in the art and are used for generating DC power from solar energy. The plurality of photovoltaic panels $108_1$, $108_2$ ... $108_n$ (also referred to herein as solar panels) may be of any size or shape. Even though the system 100 shows eight (8) photovoltaic panels $108_1$, $108_2$ ... $108_n$, the system 100 may include any number of the photovoltaic panels 108.

Each photovoltaic panel $108_1$, $108_2$ ... $108_n$ is coupled to a micro-inverter $102_1$, $102_2$ ... $102_n$. The micro-inverter $102_1$, $102_2$ ... $102_n$ converts DC power generated by the plurality of photovoltaic panels $108_1$, $108_2$ ... $108_n$ into AC power. The micro-inverters of the present invention meter out current that is in-phase with the AC grid current and generate such current with low distortion.

The micro-inverters $102_1$, $102_2$ ... $102_n$ couple the output AC to an AC bus 114. The AC bus 114 is terminated into a junction box 104. Using such an AC bus 114 and individual inverters, the system 100 is scalable and flexible to fit any user's needs. The structure and function of the micro-inverters $102_1$, $102_2$ ... $102_n$ are discussed below.

The junction box 104 generally connects together the outputs from all the micro-inverters $102_1$, $102_2$ ... $102_n$ to form a single AC feed to the electric panel 106.

The electric panel 106 connects the power from the junction box 104 to the power grid 112 and, in some applications, to appliances 116 within a user's facility. For example, in a home, the electric panel 106 is a well-known AC distribution hub comprising various circuit breakers and/or fuses to distribute electricity to various circuits within the home. The electric panel 106 is coupled through the electric meter 110 to the power grid 112. The meter 110 determines the amount of power supplied to the grid, such that the owner of the system 100 can be compensated for supplying electricity.

Figure 2:
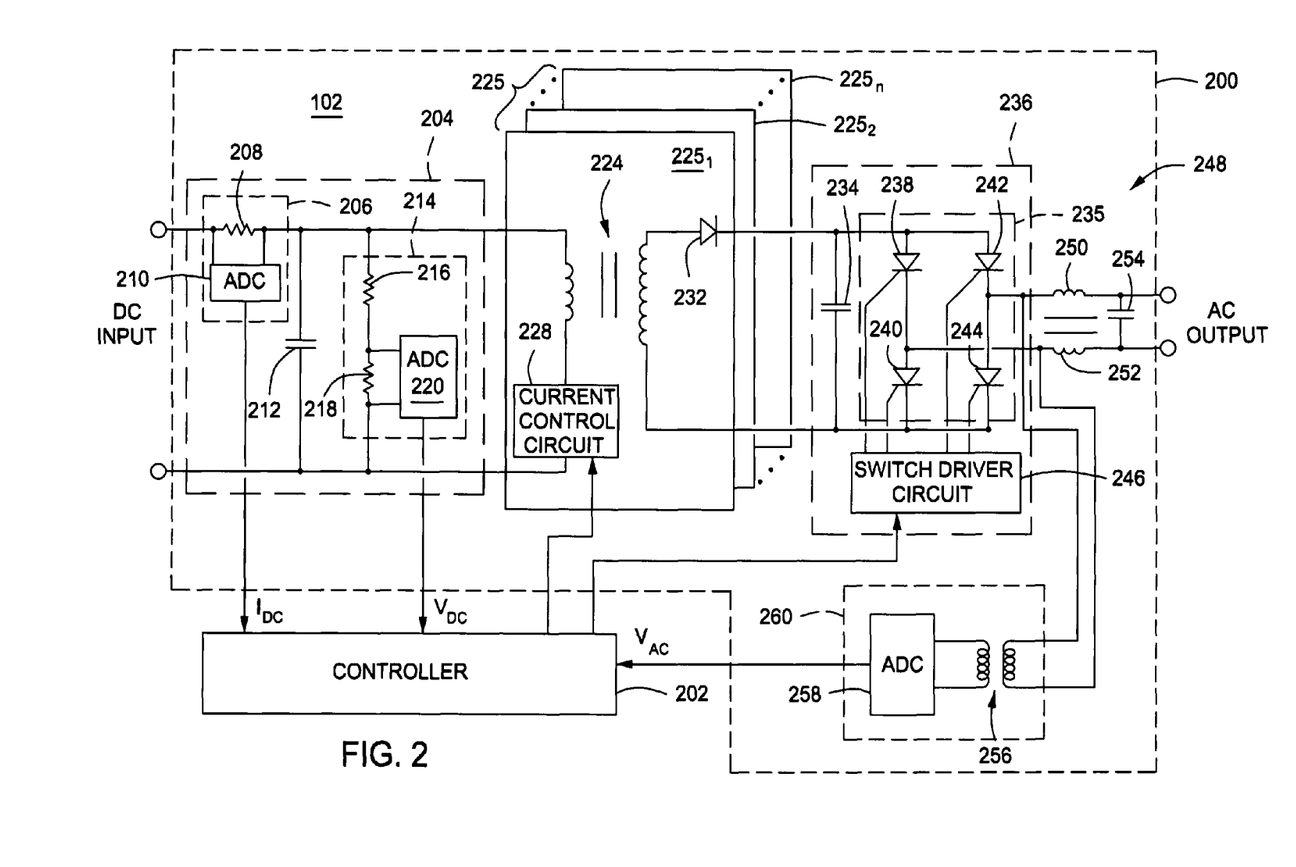
FIG. 2 is a detailed schematic diagram of an exemplary micro-inverter of FIG. 1.

FIG. 2 is a detailed schematic diagram of an exemplary embodiment of the micro-inverter of FIG. 1. The micro-inverter 102 comprises a power conversion circuit 200 and a controller 202. The power conversion circuit 200 comprises an input circuit 204 (also referred to as the DC circuit), at least one power stages $225_1$, $225_2$ ... $225_n$, an output circuit 236 (also referred to as the AC circuit), an output filter circuit 248, and an AC voltage sampler 260. The power stage 225 is coupled between the input circuit 204 and the output circuit 236.

The power conversion circuit 200 is controlled by controller 202 to efficiently convert the DC to AC. To optimize the efficiency, the controller 202 selects various flyback modes of operation for the power conversion circuit 200 depending upon the present state of the DC input voltage, DC input current and AC output voltage. As such, in one embodiment, the power conversion circuit 200 switches amongst a regular flyback mode, an interleaved mode, a quasi-resonant mode, or combinations thereof, where regular flyback mode is used during a low output voltage and current state, interleaved flyback mode is used during a high output current state, and quasi-resonant interleaved flyback mode is used during a high output voltage state. At a high current, high voltage state, an interleaved, quasi-resonant mode may also be used. These mode changes actively occur during each switching cycle of the power conversion circuit 200 to optimally convert DC power to AC power.

The input circuit 204 is coupled to one or more power stages $225_1$, $225_2$ and will utilize one or more of the stages depending on whether the conversion circuit 200 is operating in an interleaved flyback mode. In some embodiments of the invention, only one power stage is used and an interleaved flyback mode is unavailable. The input circuit 204 accepts DC input, for example, DC input generated by at least one photovoltaic panel. The input circuit 204 comprises a DC current sampler 206, an input capacitor 212, and a DC voltage sampler 214.

The ripple voltage across the input capacitor 212 has the form of a sine wave at double the line frequency and has a voltage excursion that equals the output voltage of the solar panel. By integrating the power (V×I) generated by the panel across both halves of the cycle, the controller 202 can determine an optimal operating voltage for the panel, i.e., control the output current of the inverter to maintain an optimal load for the panel.

To facilitate using the panel power as a control metric, the input circuit 204 comprises a DC voltage sampler 214 and a DC current sampler 206. The DC current sampler 206 comprises a sampling resistor 208 and an A/D Converter (ADC) 210, which may be coupled in parallel to the resistor 208. The ADC 210 generates digital samples that represent the DC current. The samples are coupled to the controller 202. One terminal of the sampling resistor 208 is coupled to the DC input and the other terminal is coupled to the input capacitor 212 and the DC voltage sampler 214. The terminal of the input capacitor 212 is coupled to the DC input.

The DC voltage sampler 214 comprises a voltage divider circuit comprising two (2) serially connected resistors 216 and 218 (forming a voltage divider) and an ADC 220. One terminal of the resistor 216 is coupled to the filter capacitor 212 and the resistor 208. The second terminal of the resistor 216 is coupled to the resistor 218. The resistor 218 is coupled in parallel to the ADC 220. The second terminal of the resistor 218 is coupled to the filter capacitor 212. The ADC 220 outputs DC voltage samples from the DC voltage sampler 214 to the controller 202.

The power stages $225_1$, $225_2$ ... $225_n$ are connected to one another in parallel. Each stage 225 comprises a transformer 224, a diode 232, and a current control circuit 228. Each power stage 225 performs a DC to DC conversion and generates a positive rectified sinewave. This rectified sinewave is unfurled by the output circuit 236 to form a true AC waveform. The primary winding (coil) of the transformer 224 is coupled to the input circuit 204 and the secondary winding (coil) of the transformer 224 is coupled through the diode 232 to the output circuit 236. The current control circuit 228 controls the DC voltage that is applied to the primary coil in accordance with signals generated by the controller 202. Each stage 225 is independently utilized such that the stages can be interleaved and share the current load for the micro-inverter 102. Selection of a stage is performed by activating the control circuit 228 of a selected stage. The transformer 224 creates a "stepped up" voltage that is proportional to the windings ratio $N_s/N_p$, where $N_p$ is the number of windings in the primary coil and $N_s$ is the number of windings in the secondary coil. In one embodiment, the voltage is increased four fold across the transformer 224. The secondary voltage is applied to the diode 232 to produce a rectified sine wave at the output of each power stage 225. The conversion process of all the stages 225 is controlled by the current control circuit 228 of each stage, which is described in detail with respect to FIG. 7 below.

The secondary coil of the transformer 224 couples in parallel to the output circuit 236. The output circuit 236 comprises a filter capacitor 234 and a switch circuit 235. The capacitor 234 removes certain spurious AC signals from the output signal. The energy at the output of the secondary winding may be pulsatile in nature. The capacitor 234 averages each cycle to form a smooth rectified sine wave. The switch circuit 235 selectively applies the rectified sine wave to either "line" or "neutral", the AC output terminals. The switching of the switch circuit 235 is controlled by the controller 202 to maintain phase synchronicity with the line voltage.

The switch circuit 235 comprises a plurality of electronic switches. In one embodiment, the circuit 235 comprises four (4) silicon-controlled rectifiers (SCR) 238, 240, 242 and 244 (e.g., thyristors or triacs). In other embodiments, the SCRs may be replaced with other electronic switches, such as, insulated gate bipolar transistor (IGBT), bipolar junction transistor (BJT), MOSFET, gate turnoff thyristor (GTO) and the like. The SCR's 238, 240, 242 and 244 output is controlled by the switch driver circuit 246. The cathode terminal SCR 238 is coupled to the anode of diode 232 and the filter capacitor 234. The anode terminal of the SCR 238 is coupled to the SCR 240. The control terminal of the SCR 238 is coupled to the switch driver circuit 246. The cathode terminal of the SCR 240 is coupled to the SCR 238 and the anode terminal of the SCR 240 is coupled to the filter capacitor 234 and the transformer 224. The control terminal of the SCR 240 is coupled to the switch driver circuit 246, which may perform galvanic insulation by using photocouplers, pulse transformers or the like to isolate the output circuit 236 from the controller 202.

The cathode terminal of the SCR 242 is coupled to the SCR 238 and the anode terminal is coupled to the SCR 244. The cathode terminal of the SCR 244 is coupled to the SCR 242 and the anode terminal is coupled to the SCR 240. The control terminals of both the SCRs 242 and 244 are coupled to the switch driver circuit 246. The switching of the SCRs is timed to ensure that the AC voltage is synchronously applied to the output terminals to match the phase of the grid voltage.

The output filter circuit 248 comprises two (2) inductors 250 and 252, and a capacitor 254. The first terminal of the inductor 250 is coupled between the SCR 242 and the SCR 244. The second terminal of the inductor 250 is coupled to the capacitor 254. The first terminal of the inductor 252 is coupled between the SCR 238 and the SCR 240. The second terminal of the inductor 252 is coupled to the capacitor 254. The output circuit 236 provides AC with a phase that is defined by the controller 202. The SCRs 238, 240, 242 and 244 are switched according to a switching signal generated by the controller 202. The AC output is formed across the capacitor 254. The filter 248 removes harmonic signals and various high frequency voltage spikes from the output voltage.

The AC voltage sampler 260 provides AC samples to the controller 202. The AC voltage sampler 260 comprises an isolation transformer 256 and an ADC 258 (or a limiter). The first terminal of the primary coil of the isolation transformer 256 is coupled to the first terminal of the inductor 250. The second terminal of the primary coil of the isolation transformer 256 is coupled to the first terminal of the inductor 252. Both terminals of the secondary coil of the isolation transformer 256 are coupled to the ADC 258. The ADC 258 outputs an AC voltage sample to the controller 202.

The power conversion circuit 200 converts DC to AC in accordance with the control and switching signals produced by the controller 202. As shall be described below, the controller 202 produces the control and switching signals in response to the samples of the DC and AC signals. Consequently, the power conversion circuit 200 may be optimally controlled to utilize a particular mode of operation to correspond to the present state of the DC and AC signals, i.e., to optimally match the AC output to the phase of the power grid such that the AC power is efficiently coupled to the power grid.

The controller 202 causes the power conversion circuit 200 to switch amongst various modes: simple flyback, quasi-resonant flyback, interleaved flyback and combinations thereof. The task of the controller 202 is to (1) control the power conversion circuit to have effective Maximum Power Point Tracking (MPPT), which alternatively may be performed by another circuit; (2) estimate the phase, voltage and frequency of the AC voltage; (3) accommodate unexpected behaviors such as over-current in the power stage; and (4) report to the end user data such as statistics on AC power generated by the micro-inverter.

Figure 3:
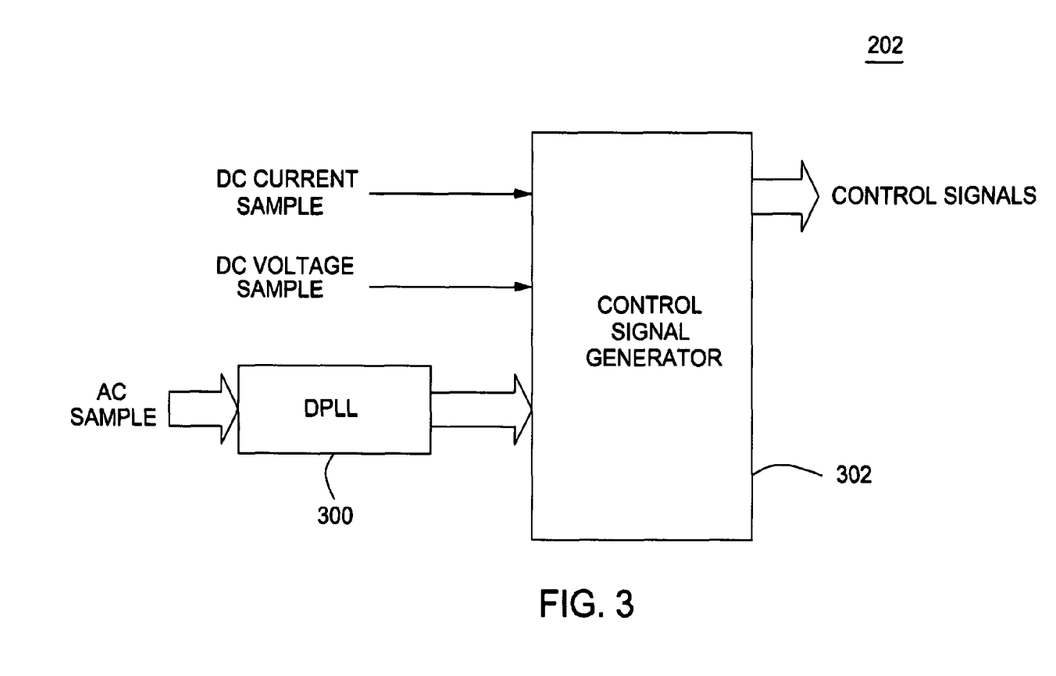
FIG. 3 is a block diagram of an exemplary embodiment of the controller of FIG. 2.

FIG. 3 is a high level block diagram of the controller 202 comprising a digital phase lock loop (DPLL) 300 and a control signal generator 302. The DPLL 300 phase locks an oscillator to the AC voltage samples to produce a digital signal (e.g., an 8-bit signal) that is representative of the phase of the input signal. The phase signal is coupled to the control signal generator 302. The generator 302 uses the DC current, DC voltage and phase information to produce control signals for the current control circuit 228 and the switch circuit 235 of FIG. 2.

Figure 4:
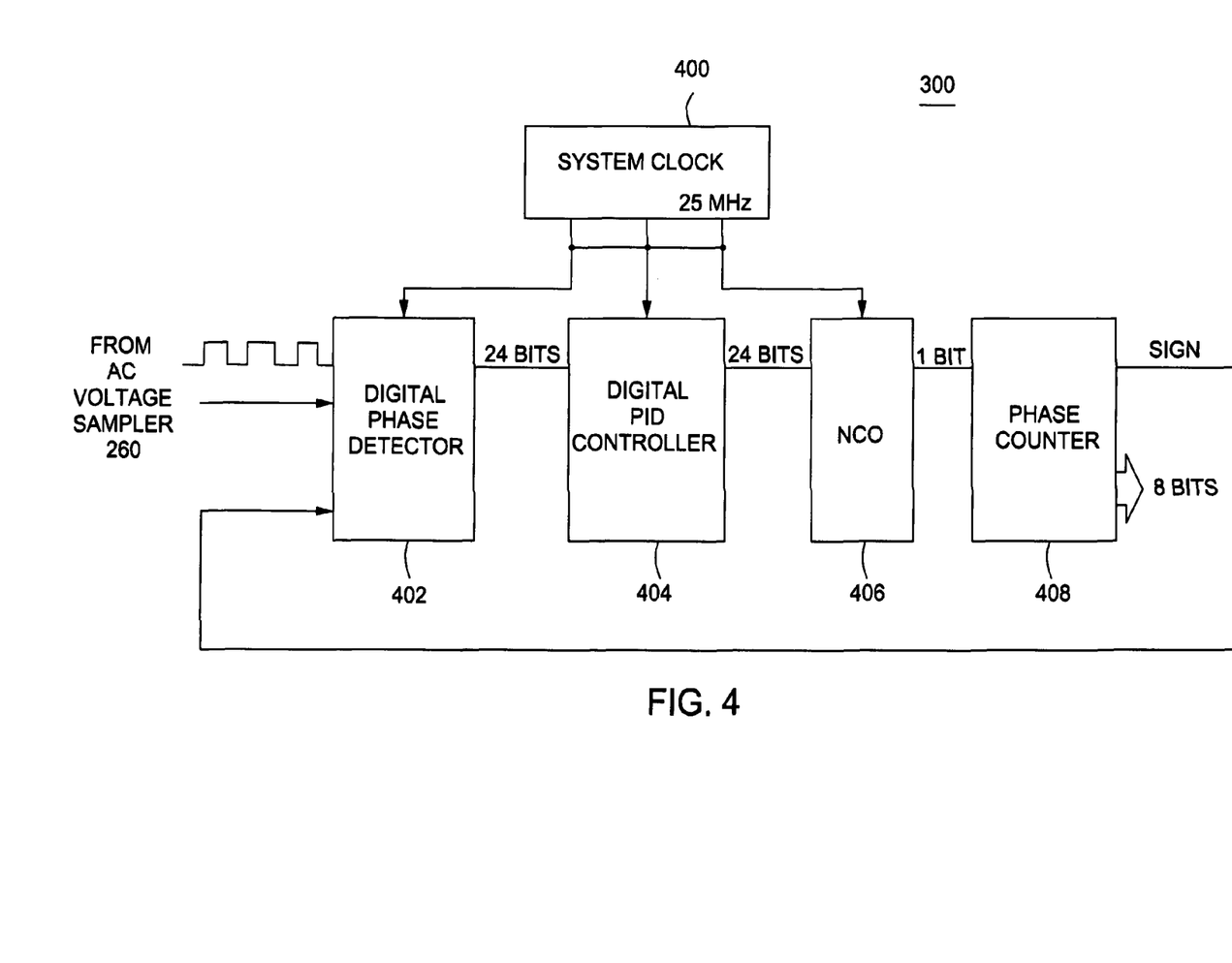
FIG. 4 is a block diagram of an exemplary embodiment of the digital phase lock loop of FIG. 3.

FIG. 4 is a detailed block diagram of an exemplary embodiment of the DPLL 300 FIG. 3. The DPLL 300 comprises a digital phase detector 402, a digital PID (Proportional, Integral Derivative) controller 404, a numerically controlled oscillator (NCO) 416, a phase counter 408 and a system clock 400.

The DPLL 300 operates in a conventional manner where the output of the NCO 406 is phase locked to the AC voltage samples from the AC voltage sampler 260. In this embodiment, the loop filter for the DPLL 300 is the PID controller 404. Other forms of loop filter implementations are available and can be used in the DPLL 300. In operation, the sign bit from the phase counter 408 is compared to the sampled AC voltage using the phase detector 402 to produce a phase error, e.g., a 24-bit signal. The phase error is filtered by the PID controller 404 and applied to the NCO 406. The NCO 406 generates a signal in accordance with the clock (e.g., 25 MHz) and the phase difference. The NCO output is coupled to the phase counter to produce a phase signal (e.g., an 8-bit signal) representing the AC voltage phase locked to the system clock signal.

Figure 5:
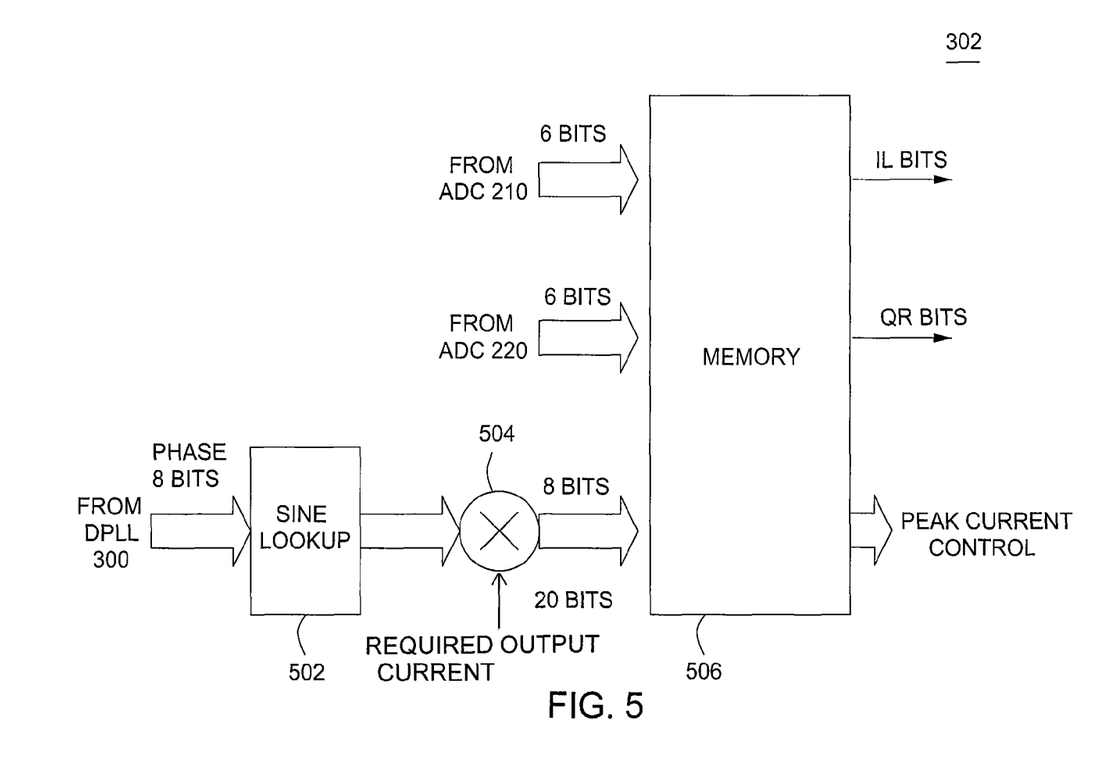
FIG. 5 is a detailed block diagram of an exemplary embodiment of the control signal generator.

FIG. 5 is a detailed block diagram of an exemplary embodiment of the control signal generator 302 (see FIG. 3). The control signal generator 302 comprises a sine lookup table 502, a multiplier 504 and a memory 506. The sine lookup table 502 receives the phase signal produced by the DPLL 300 and generates a sinusoidal signal in accordance with the phase signal. In essence, this table 502 creates a waveform that is phase locked to the power grid voltage. Thus, the sine lookup table assists in generating a low distortion current on the grid, regardless of the actual voltage waveform. The multiplier 504 multiplies the waveform with the required output current. The result is a scaled digital signal representing a required output current. This signal is coupled to the memory 506 as an address.

The memory 506 is any type of computer readable memory. The memory 506 may comprise random access memory or read only memory. The memory 506 receives the signals generated by the ADC 210 and ADC 220 (e.g., 6-bit signals) in addition to the 8-bit sinusoidal signal. As such, a 20-bit word is used to address the memory. The memory 506 receives the address inputs and outputs an inverter mode and phase signal settings, such as, Interleaved (IL) bit, a quasi-resonant (QR) bit, and peak current control bits. These signals are used to control the power conversion circuit 200.

In the depicted embodiment of the control signal generator, the memory 506 is used as a lookup table that is sequenced by the 20 bit address. As such, the present values of DC current, DC voltage and AC phase are used to select the control signals to facilitate operation of the inverter in a particular mode. The memory 506 is preloaded with a table that represents the control signals to be generated for various combinations of DC current, DC voltage, and AC phase. Although a memory is used in this embodiment, those skilled in the art will realize that a microprocessor or microcontroller may also be used to generate the control signals in view of the DC current, DC voltage and AC phase.

Figure 6:
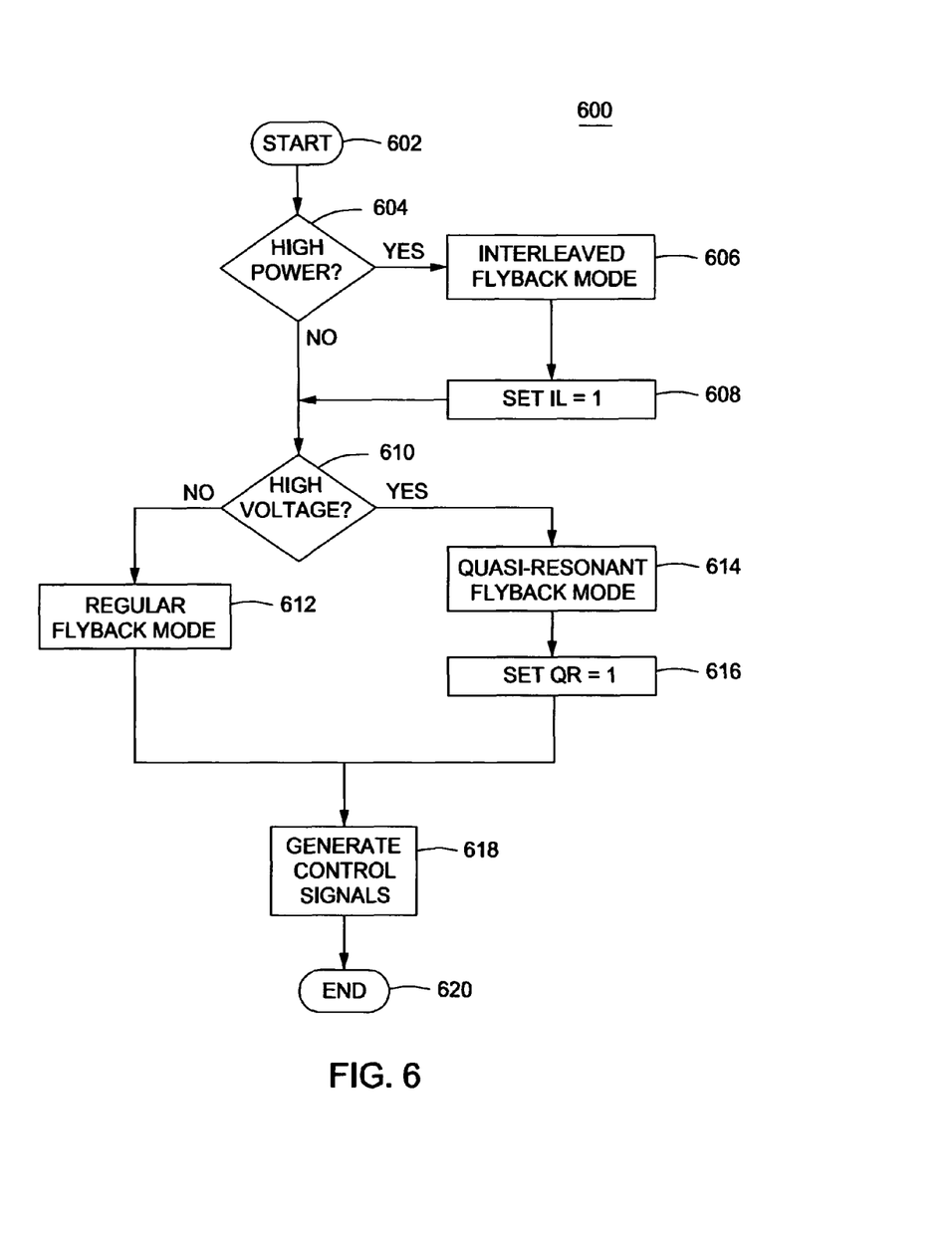
FIG. 6 is a flow diagram depicting an exemplary embodiment of a method of operation of a micro-inverter of the present invention.

FIG. 6 is a flow diagram depicting an exemplary embodiment of a method 600 of operation of a micro-inverter of the present invention. This method 600 is performed at each sequence step, e.g., for each clock transition. As such, during a given AC cycle the inverter may utilize different modes of operation during the cycle.

The method 600 starts at step 602 and proceeds to step 604. At step 604, the method 600 performs calculations and checks if the input power is greater than a power threshold. To compute the input power, the DC voltage sample is multiplied by the DC current sample. If the operating power is greater than the power threshold, the method 600 proceeds to step 606, wherein the mode is an interleaved flyback mode. The interleaved flyback mode selects additional power stages to be used to share the power conversion requirements of the system. The threshold is set to ensure that additional stages are used if the input power level exceeds the safe level of a single power stage. Additional stages can be used in proportion to the amount of power. If additional stages are necessary, at step 608, the interleaved mode bit is set (IL=1). In other embodiments, the micro-inverter may not utilize an interleaved flyback mode, i.e., only one power stage is present. In such embodiments, steps 604, 606 and 608 are not used.

In the embodiment which uses a memory as a lookup table, the values of current and voltage representing a "high" power level are used to address a table entry that outputs IL=1, otherwise IL=0 for "low" power levels. An embodiment using a microprocessor would implement the flow diagram as a functional if, then, else statement.

At step 610, the method 600 queries whether the DC output voltage is sufficient to warrant using a quasi-resonant flyback mode for the power conversion circuit 200. If the query is negatively answered, the method 600 switches to, or remains in, a regular flyback mode. If, however, the DC input voltage is sufficient to have an affirmative answer to the query of step 610, the method 600 proceeds to step 614 wherein a quasi-resonant flyback mode is selected. Note that a combination mode of either interleaved, quasi-resonant flyback mode or interleaved, regular flyback mode is also selectable. At step 616, a quasi-resonant bit (QR=1) is set. At step 618, the current signal and the mode selection bits are created. The method ends at step 620.

Figure 7:
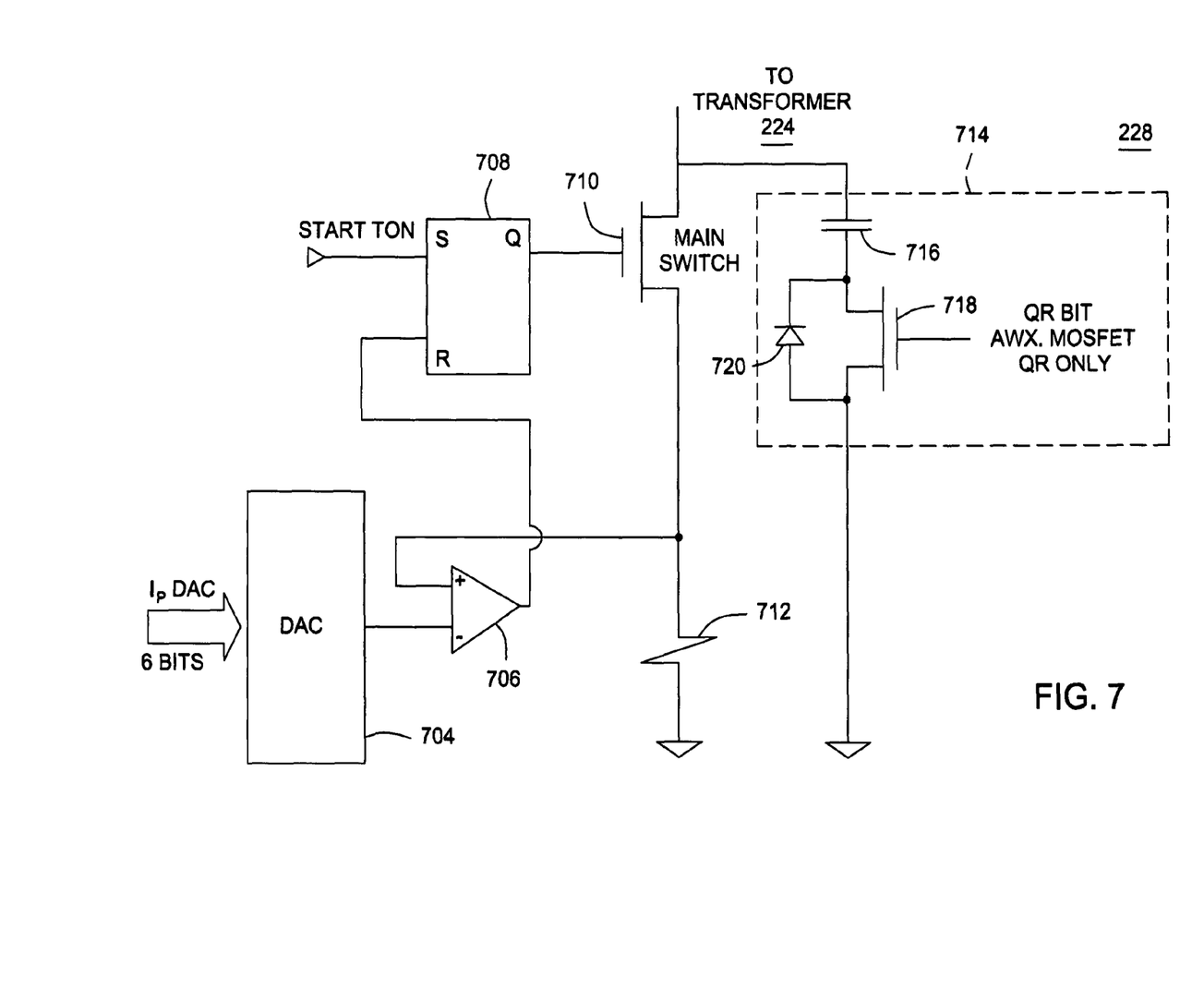
FIG. 7 is a detailed schematic diagram of an exemplary embodiment of the current control circuit.

FIG. 7 is a detailed schematic diagram of an exemplary embodiment of the current control circuit 228 (FIG. 2). The circuit 228 comprises a digital-to-analog converter (DAC) 704, a comparator 706, a flip-flop 708, a switch 710, a resistor 712, and an auxiliary quasi-resonant (QR) mode circuit 714. The peak current control signal generated by the memory 506 is coupled to the DAC 704. The DAC 704 converts the digital signal into an analog signal that is coupled to the negative input of the comparator 706. One terminal of the bias resistor 712 couples with the positive input of the comparator 706 and the drain of the switch 710. The switch 710 may be a MOSFET, BJT, IGBT or any other form of switch known in the art. The other terminal of the resistor 712 is grounded. As such, the comparator 706 operates as a switch depending on the level of the current control signal relative to the signal at the bias resistor 712. The relative state of the two signals resets the SR flip-flop 708.

The flip-flip 708 has two (2) inputs, "R" and "S", and one (1) output, "Q". The output of the op-amp 706 couples to the "R" input of the flip-flop 708. The Start Ton signal, which may also be the power transfer cycle start, is coupled to the "S" input of the flip-flop 708. The "Q" output drives the gate of the switch 710.

The auxiliary QR circuit 714 is triggered by the switch 718 when the mode is a quasi-resonant. The auxiliary QR circuit 714 comprises a capacitor 716, a diode 720, and an auxiliary power switch 718 (MOSFET). The circuit 714 switches a capacitor 716 across the main switch 710 to facilitate quasi-resonant operation of the circuit. The first terminal of the capacitor 716 couples to the source terminal of the main switch 710. The second terminal of the capacitor 716 couples to the source terminal of the switch 718. The drain terminal of the switch 718 is coupled to ground. The diode 720 is connected across the drain and source terminals. The gate of the switch 718 is controlled by the QR bit from memory 506.

When operating in a flyback mode, at the beginning of a cycle, the current in the primary coil is zero (0) and the main switch 710 is then turned on. The current in the primary coil increases linearly until a predetermined value Ipp is reached, upon which the switch 710 is opened. The energy stored in the primary coil is then transferred to the secondary coil, in which the current instantaneously raises to Ipp/n, where n is the secondary primary turn ratio for the transformer. The voltage on the primary switch increases to Vin+Vout/n. The current in the secondary drops linearly to zero with a slope of Vout/Ls, when the output diode (232 in FIG. 2) turns off and the cycle can be started again. A cycle duration is from 2 to 50 µs in most applications.

When operating a quasi-resonant flyback mode, the inverter utilizes the parasitic capacitance of the main switch 710 or, in the depicted embodiment, an added capacitance (e.g. capacitor 716) to absorb the leakage inductance energy. Thus, the QR bit is set to turn on the switch 718 and place the additional capacitor across the main switch 710. Also, by adequately choosing the turn-on time of the switch 710, it is possible to have a zero voltage turn-on characteristic as well as turn-off. This is performed to the benefit of the overall efficiency. One of the issues with this approach is that true zero voltage cannot be achieved for all operating conditions. For instance, the secondary reflected voltage (Vout/n) must be higher than the input voltage to have a zero voltage turn-on.

In an interleaved mode, two or more individual power stages (either operating in flyback or quasi-resonant flyback) can be combined to operate at the same frequency at each cycle while phase interleaved. In this manner, very high current can be handled by the inverter. The main power stage is used most of the time, while an auxiliary power stage may be used when required, i.e., when the IL bit is set. The auxiliary power stage is operated with a delay. If two power stages are used, then the delay is ½ of an AC cycle, if 3 power stages are used, then the delay is ⅓ of an AC cycle and so one for N stages. Such an inverter may have many advantages, including reduction in the size of the parts used in the power path; a current rating in each power stage halved compared to a single power stage approach; and a reduction in EMI/RFI generation.

The foregoing approach is used to dynamically change the topology of the inverter from regular flyback to interleaved flyback to interleaved quasi-resonant based on the required output voltage and current. At lower voltage and current outputs, the current in the primary is such that a little amount of energy is lost in the leakage inductance at turn-off and discharge of the parasitic capacitance at turn-on. At medium output currents, it is possible to interleave two power stages in order to reduce "root mean square" currents in the input and output filters, and therefore the output noise. When the output voltage is sufficiently large, the system is switched into quasi-resonant mode in order to improve the overall efficiency.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus for power conversion, comprising:
   at least two power stages coupled between an input circuit and an output circuit, each power stage of the at least two power stages capable of converting DC input power to DC output power; and
   a controller for dynamically selecting one or more power stages of the at least two power stages for converting a first DC power to a second DC power, wherein the at least two power stages are connected in parallel.

2. The apparatus of claim 1, wherein the controller dynamically selects the one or more power stages based on a required output current.

3. The apparatus of claim 2, wherein the controller additionally dynamically selects a flyback mode from a plurality of flyback modes for operating the one or more power stages based on an input voltage to the at least two power stages.

4. The apparatus of claim 3, wherein the plurality of flyback modes comprises a regular flyback mode and a quasi-resonant flyback mode.

5. The apparatus of claim 2, wherein each of the one or more power stages is operated with a delay.

6. The apparatus of claim 5, wherein the delay is 1/N of a power cycle, wherein N is a number of power stages in the one or more power stages.

7. The apparatus of claim 2, further comprising the output circuit coupled to the at least two power stages for converting the second DC power to AC power.

8. A method for power conversion, comprising:
   receiving a first DC power;
   dynamically selecting one or more power stages from at least two power stages coupled between an input circuit and an output circuit of a power conversion circuit, each power stage of the at least two power stages capable of converting DC input power to DC output power; and
   converting, via the one or more power stages, the first DC power to a second DC power, wherein the at least two power stages are connected in parallel.

9. The method of claim 8, further comprising dynamically selecting the one or more power stages based on a required output current.

10. The method of claim 9, further comprising dynamically selecting a flyback mode from a plurality of flyback modes for operating the one or more power stages based on an input voltage to the at least two power stages.

11. The method of claim 10, wherein the plurality of flyback modes comprises a regular flyback mode and a quasi-resonant flyback mode.

12. The method of claim 9, wherein converting the first DC power comprises operating each of the one or more power stages with a delay.

13. The method of claim 12, wherein the delay is 1/N of a power cycle, wherein N is a number of power stages in the one or more power stages.

14. The method of claim 9, further comprising converting the second DC power to AC power.

15. A system for power conversion, comprising:
   a plurality of photovoltaic (PV) modules; and
   a plurality of microinverters coupled to the plurality of PV modules in a one-to-one correspondence, where each microinverter comprises:
      at least two power stages coupled between an input circuit and an output circuit, each power stage of the at least two power stages capable of converting DC input power from a coupled PV module to DC output power; and
      a controller for dynamically selecting one or more power stages of the at least two power stages for converting a first DC power to a second DC power.

16. The system of claim 15, wherein the controller dynamically selects the one or more power stages based on a required output current.

17. The system of claim 16, wherein the controller additionally dynamically selects a flyback mode from a plurality of flyback modes for operating the one or more power stages based on an input voltage to the at least two power stages.

18. The system of claim 17, wherein the plurality of flyback modes comprises a regular flyback mode and a quasi-resonant flyback mode.

19. The system of claim 16, wherein each of the one or more power stages is operated with a delay of 1/N of a power cycle, wherein N is a number of power stages in the one or more power stages.

20. The system of claim 16, wherein each microinverter further comprises the output circuit coupled to the at least two power stages for converting the second DC power to AC power.

* * * * *